United States Patent
Cheng (10) Patent No.: US 8,888,123 B1
(45) Date of Patent: Nov. 18, 2014

(54) FOLDING STRUCTURE OF BABY STROLLER AND METHOD FOR FOLDING THE BABY STROLLER

(71) Applicant: Pao-Hsien Cheng, Tainan (TW)

(72) Inventor: Pao-Hsien Cheng, Tainan (TW)

( * ) Notice: Subject to any disclaimer, the term of this patent is extended or adjusted under 35 U.S.C. 154(b) by 0 days.

(21) Appl. No.: 13/930,613

(22) Filed: Jun. 28, 2013

(51) Int. Cl.
*B62B 7/06* (2006.01)

(52) U.S. Cl.
CPC ...................................... *B62B 7/062* (2013.01)
USPC .......................................... 280/643; 280/648

(58) Field of Classification Search
CPC .......... B62B 7/06; B62B 7/062; B62B 7/064; B62B 7/066; B62B 7/068
USPC ........... 280/642, 643, 646, 42, 647, 648, 649, 280/650, 47.38
See application file for complete search history.

(56) References Cited

U.S. PATENT DOCUMENTS

| | | | | |
|---|---|---|---|---|
| 3,000,646 A * | 9/1961 | Kummeth, Sr. | | 280/644 |
| 5,388,852 A * | 2/1995 | Bigo et al. | | 280/642 |
| 5,516,142 A * | 5/1996 | Hartan | | 280/642 |
| 5,845,917 A * | 12/1998 | Huang | | 280/47.371 |
| 6,749,227 B2 * | 6/2004 | Margid | | 280/823 |
| 7,584,985 B2 * | 9/2009 | You et al. | | 280/643 |
| 8,240,698 B2 * | 8/2012 | Tsai | | 280/647 |
| 8,636,601 B2 * | 1/2014 | Zhang et al. | | 472/119 |
| 2010/0264628 A1 * | 10/2010 | Ohnishi | | 280/651 |
| 2013/0113186 A1 * | 5/2013 | Rembisz et al. | | 280/647 |
| 2013/0113189 A1 * | 5/2013 | Doucette et al. | | 280/650 |

* cited by examiner

*Primary Examiner* — John Walters
*Assistant Examiner* — Brian Swenson
(74) *Attorney, Agent, or Firm* — Rosenberg, Klein & Lee (57) ABSTRACT

A folding structure of a baby stroller and includes two respective links which are connected to two lower ends of two handles. The links are connected to two front frames and pivotably connected with two respective slides which are pivotably connected to an X-shaped connection frame which is pivotably connected to two rear frames. When folding the baby stroller, the two handles are pushed downward to activate the slides by the links, the slides then activate the connection frame to pull the rear frames to let the stroller stand up. The handles are almost not overlapped with the front frames so as to reduce weight.

4 Claims, 8 Drawing Sheets

FOLDING STRUCTURE OF BABY STROLLER AND METHOD FOR FOLDING THE BABY STROLLER

BACKGROUND OF THE INVENTION

1. Fields of the Invention

The present invention relates to a folding structure, and more particularly, to a folding structure of a baby stroller which is folded by sliding the handles along the front frames of the stroller.

2. Descriptions of Related Art

Figure 1:
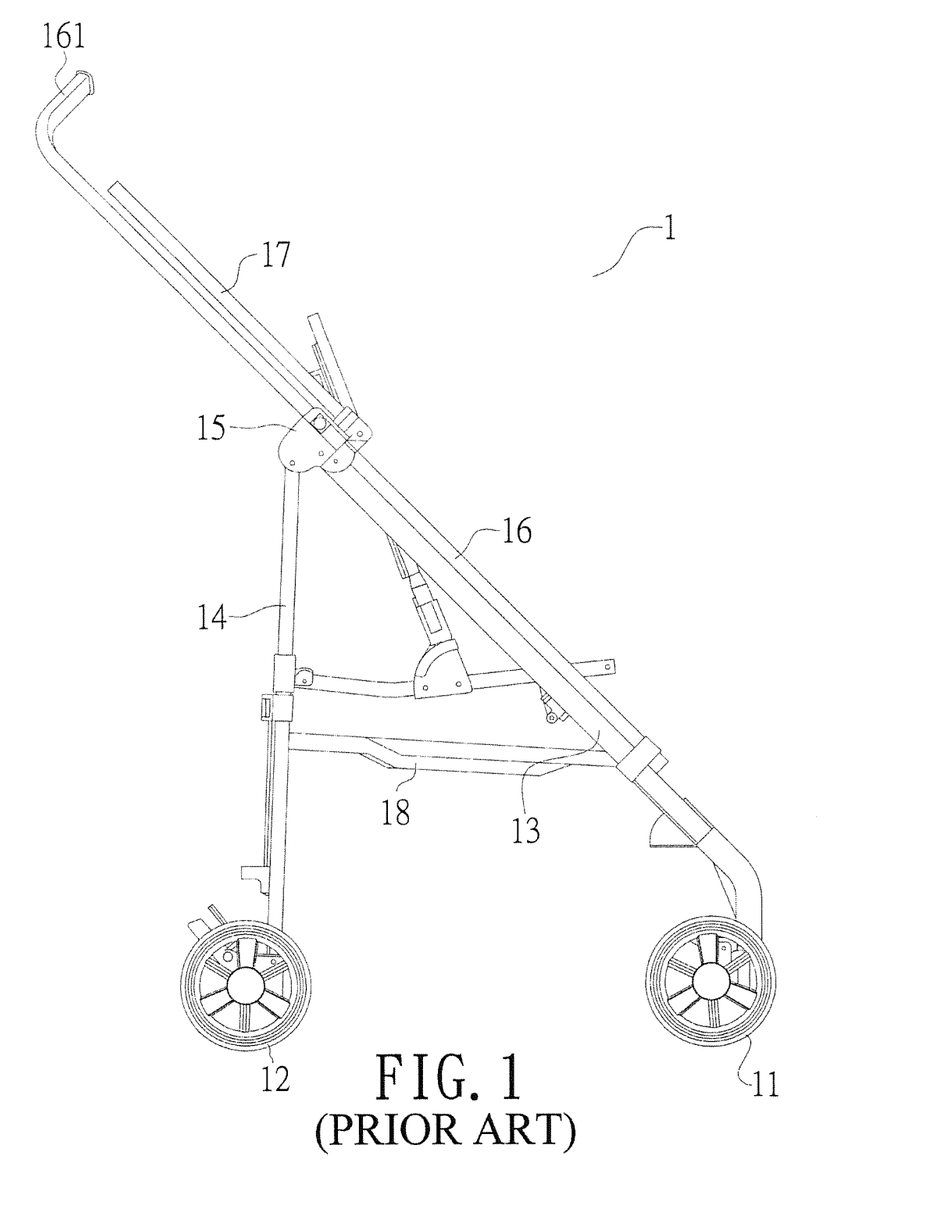
FIG. 1 is a side view to show the conventional baby stroller.

The conventional baby stroller 1 is disclosed in FIG. 1 and comprises two front wheels 11 connected to the lower ends of the front frames 13, and two rear wheels 12 connected to the lower ends of the rear frames 14. The two respective top ends of the front and rear frames 13, 14 are connected to each other by two respective connection units 15. Each front frame 13 has a handle 16 connected thereto and each handle 16 has a grip 161. A hood 17 is connected between the two connection units 15. The handles 16 are pivotably connected to the connection frame 18 which is pivotably connected between the front and rear frames 13, 14.

However, the conventional baby stroller has the following shortcomings:

The handle 16 extends to the lower end of each front frame 13 so that the material for the handle 16 and the weight of the baby stroller are increased.

When folding the baby stroller, the connection frame 18 is folded by the action of the handles 16, however, the handles 16 have fixed length and cannot be folded, so that the folded baby stroller reduces the size in lateral direction, but the size in the axial direction is not shortened. The storage space is not reduced.

The present invention intends to provide a folding structure of a baby stroller which improves the shortcomings mentioned above.

SUMMARY OF THE INVENTION

The primary object of the present invention is to provide a folding structure of a baby stroller and a method for folding the baby stroller. The baby stroller is folded by sliding downward the handles along the front frames of the stroller. The stroller is folded and the final status is the stand-up status. The volume and size of the folded stroller is smaller and the material for the handles is reduced. The manufacturing cost the weight of the stroller are both reduced.

The present invention relates to a folding structure of a baby stroller, and comprises two handles extending through two connection units respectively and the two handles are connected with two respective links. Each of the two connection units is connected with two respective top ends of the front frame and the rear frame. The two links are movable along the front frames and are pivotably connected with two respective slides. A connection frame is pivotably connected between the slides and the rear frames.

Preferably, each of the frames has a slot in which the link is movably received.

Preferably, a locking unit is located between the handle and the connection unit of each side of the baby stroller so as to lock the handle and the connection unit.

Preferably, the locking unit comprises a resilient engaging member in the handle, and a resilient pressing member connected to the connection unit. The resilient pressing member is located corresponding to the resilient engaging member. The resilient engaging member has an engaging end extending beyond the connection unit. The engaging end is released from the connection unit by pressing the resilient pressing member so as to release the locked status of the handle.

Preferably, the resilient engaging member is a U-shaped member.

Preferably, the resilient pressing member comprises a space defined in the connection unit, a button and a spring. A shoulder is formed in the inside of the space. The button has a hook which is hooked to the shoulder. The button has a push rod extending from the center thereof and the push rod is located corresponding to the engaging end. The spring is mounted to the push rod.

Preferably, two end pieces are connected to respective front ends of the connection frame. The two end pieces and two front wheels of the baby stroller support the baby stroller when the baby stroller is folded.

Alternatively, the present invention provides a method for folding a baby stroller and the method is to push the handles downward to fold the baby stroller and to let the baby stroller stand up.

The advantages of the present invention are as follows:

The stroller is folded by simply pushing the handles downward, and the folded stroller is maintained on stand-up status. The folding action is easy and quick.

The locking units release the handles and the connection units to allow the links on the lower ends of handles to activate the hood to move downward along the front frames to shorten the length and size in the longitudinal direction.

The handles extend upward from the connection units so that the handles are almost not overlapped with the front frames. The front frames are simply two tubes and the material for the handles and the weight of the stroller are saved.

The two end pieces on the respective front ends of the connection frames and the two front wheels of the baby stroller together support the baby stroller when the baby stroller is folded.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 2:
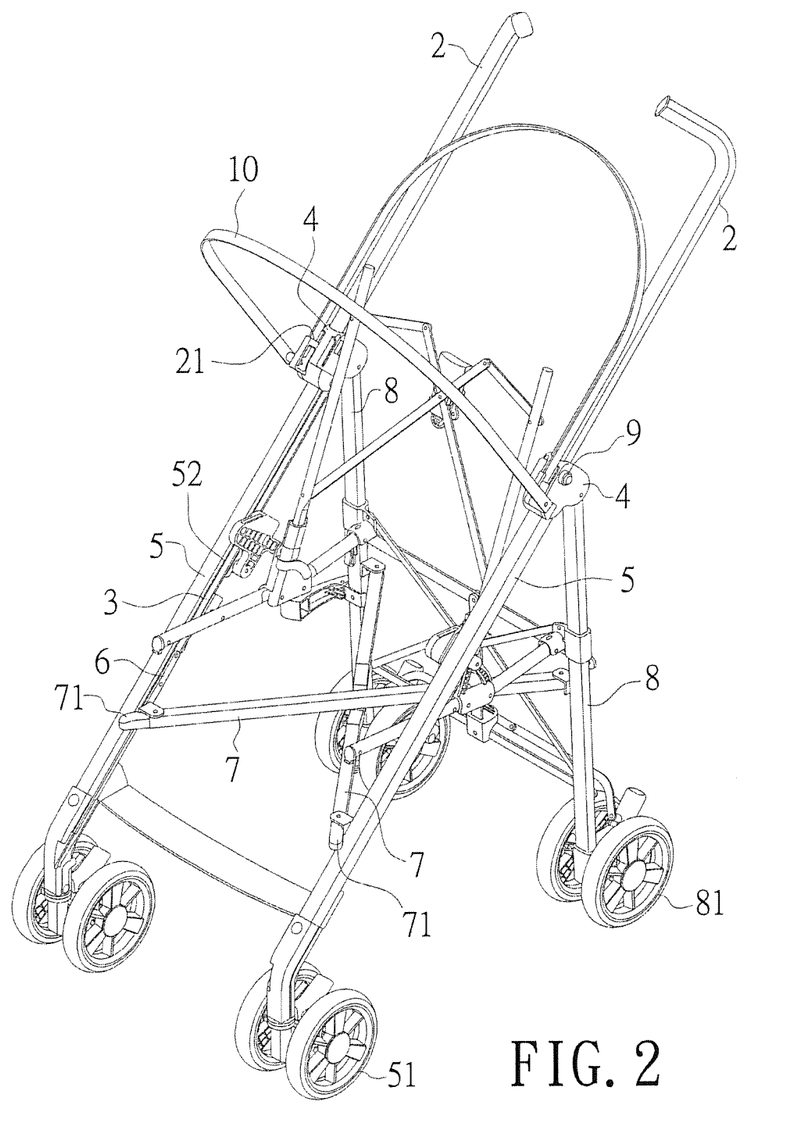
FIG. 2 is a perspective view to show the baby stroller of the present invention.
Figure 3:
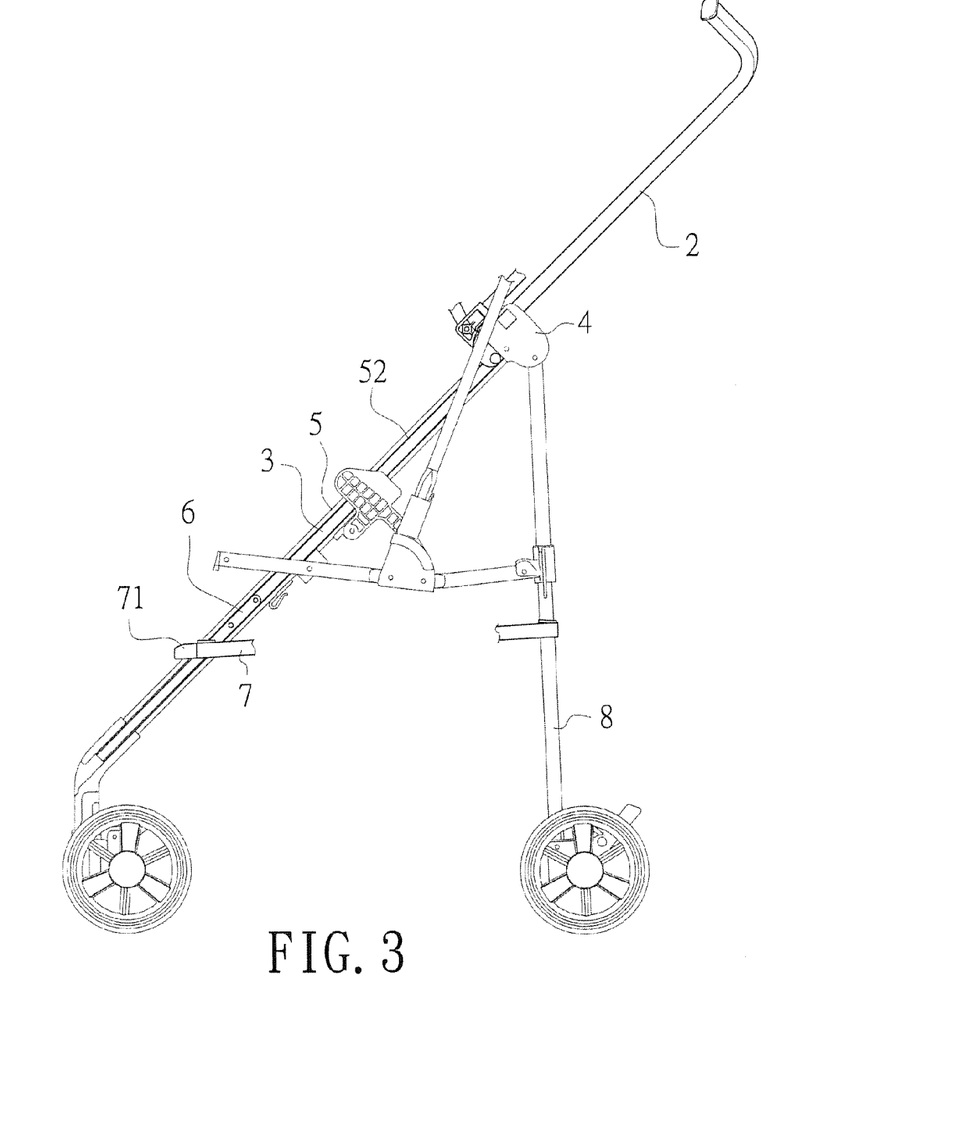
FIG. 3 is a side view to show the baby stroller of the present invention.

Referring to FIGS. 2 and 3, the baby stroller of the present invention comprises two handles 2, two links 3, two connection units 4, two front frames 5, two slides 6, a connection frame 7, two rear frames 8 and two locking units 9.

Figure 4:
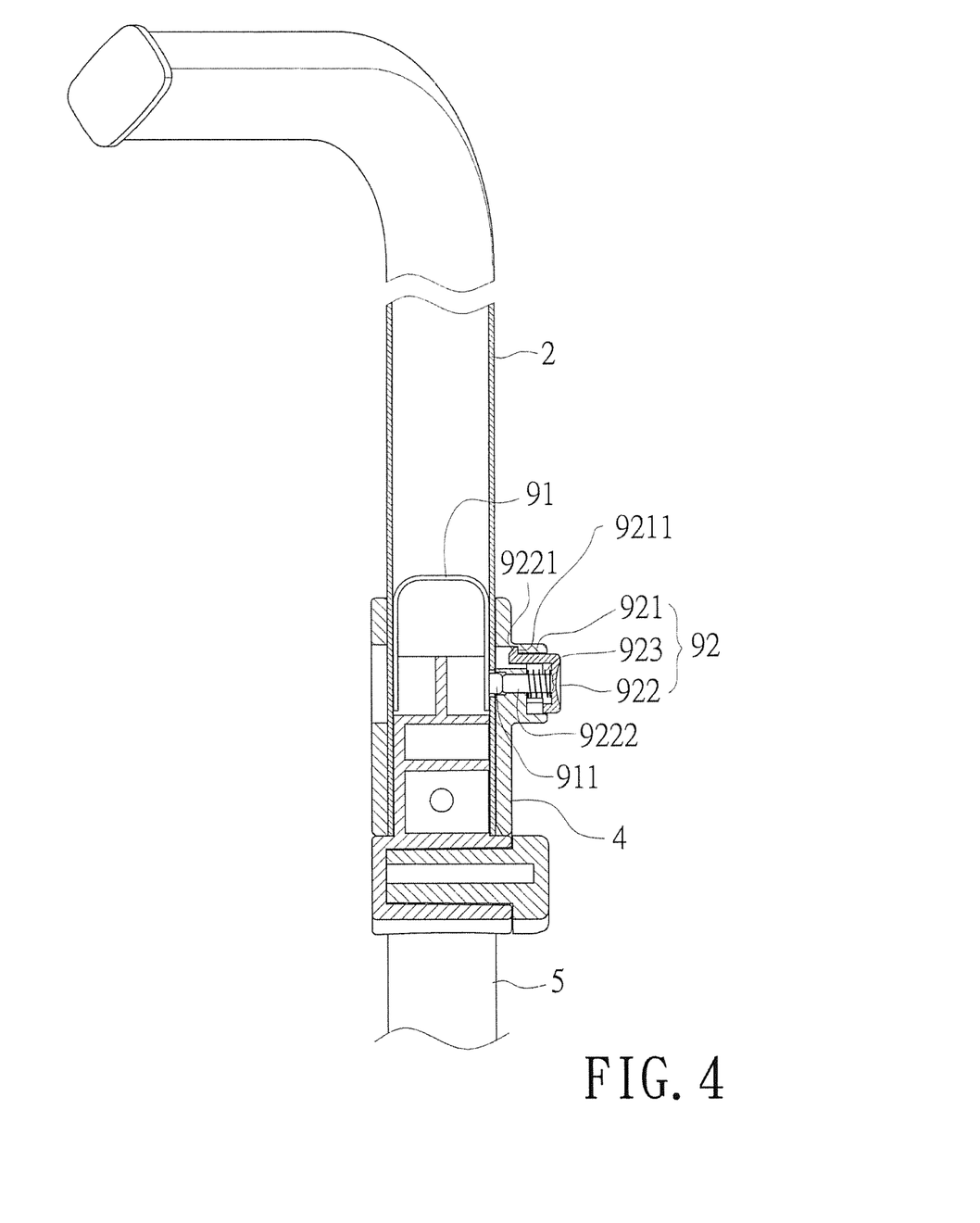
FIG. 4 is a cross sectional view to show the handle and the locking unit of the of the present invention.

Two respectively lower ends of the handles 2 extend through the two connection units 4 respectively and are connected with the two respective links 3. Each handle 2 has a slot 21 so that one of two ends of a hood 10 is inserted into the slot 21. Each of the two connection units 4 is connected with two respective top ends of the front frame 5 and the rear frame 8. Two front wheels 51 are respectively connected to the two lower ends of the two front frames 5. Each of the frames 5 has a slot 52 in which the link 3 is movably received. The two links 3 are movable along the front frames 5 and pivotably connected with the two respective slides 6. The connection frame 7 is pivotably connected between the slides 6 and the rear frames 8. The connection frame 7 is an X-shaped frame and includes two links which are pivotably connected to each other at two respective middle portions thereof. Two rear wheels 81 are connected to the two lower ends of the two rear frames 8. The locking unit 9, as shown in FIG. 4, is located between the handle 2 and the connection unit 4 of each side of the baby stroller so as to lock the handle 2 and the connection unit 4. The locking units 9 each comprise a resilient engaging member 91 in the handle 2, and a resilient pressing member 92 connected to the connection unit 4. The resilient engaging member 91 is a U-shaped member. The resilient pressing member 92 is located corresponding to the resilient engaging member 91. The resilient engaging member 91 has an engaging end 911 extending through the handle 2 and beyond the connection unit 4. The resilient pressing member 92 comprises a space 921 defined in the connection unit 4, a button 922 and a spring 923. A shoulder 9211 is formed in an inside of the space 921. The button 922 has a hook 9221 which is hooked to the shoulder 9211. The button 922 has a push rod 9222 extending from the center thereof and the push rod 9222 is located corresponding to the engaging end 911. The spring 923 is mounted to the push rod 9222 so as to return the button 922 when the button 922 is released.

Figure 5:
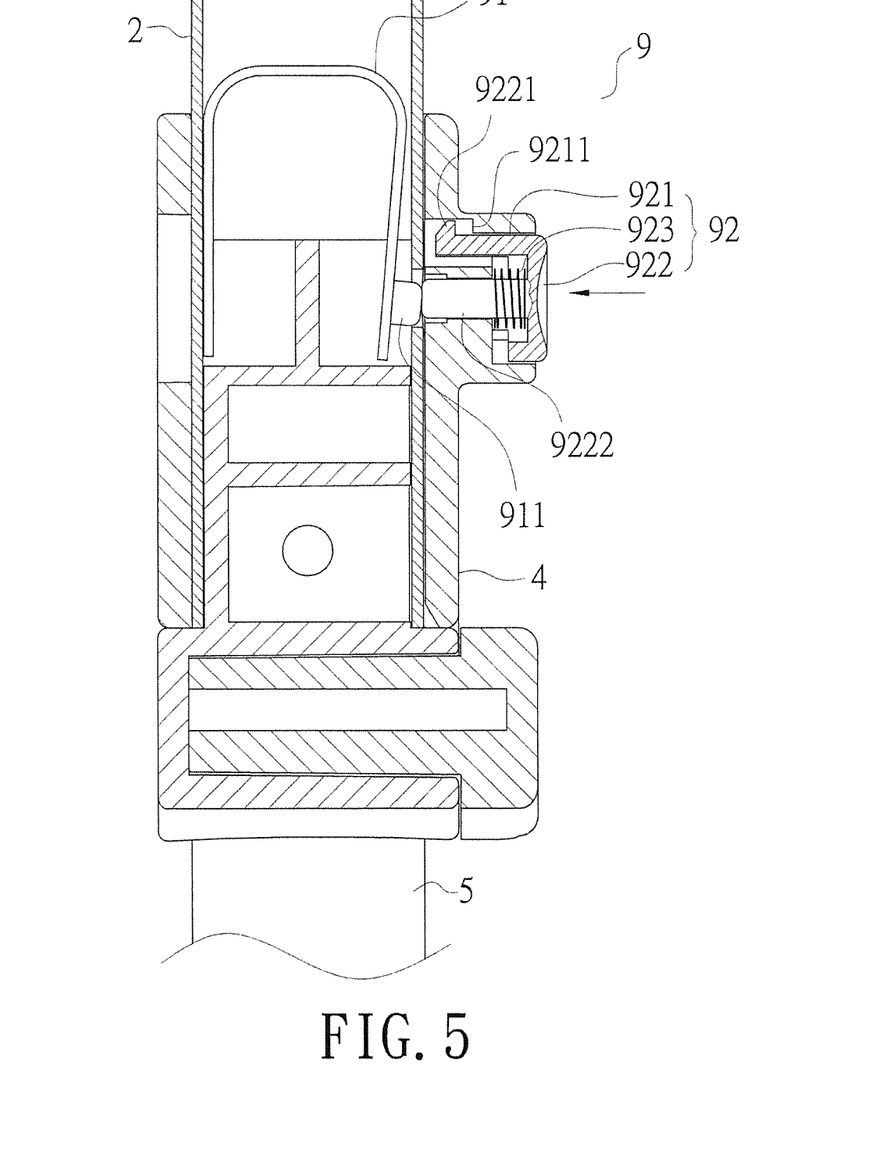
FIG. 5 is a cross sectional view to show that the handle is released.

As shown in FIGS. 4 and 5, when the resilient pressing member 92 is pushed, the spring 923 is compressed and the push rod 9222 pushes the resilient engaging member 91 so that the engaging end 911 is removed from the wall of the connection unit 4 to release the locked status of the handle 2. The handle 2 is able to be moved downward and the handle 2 is guided by the link 3 moving in the slot 52 of the front frame 5. The link 3 drives the slide 6, and the connection frame 7 that is pivotably connected to the slide 6 is then folded. The rear frame 8 is re connected to the connection frame 7 and is moved to fold the whole stroller. The two ends of the hood 10 are respectively inserted into the slots 21 in the handles 2, so that the hood 10 can be moved to a lower position to reduce the size of the folded stroller. It is noted that the hood 10 does not need to be removed from the stroller. This reduces the length in the longitudinal direction of the stroller as shown in FIGS. 6 and 7.

Figure 6:
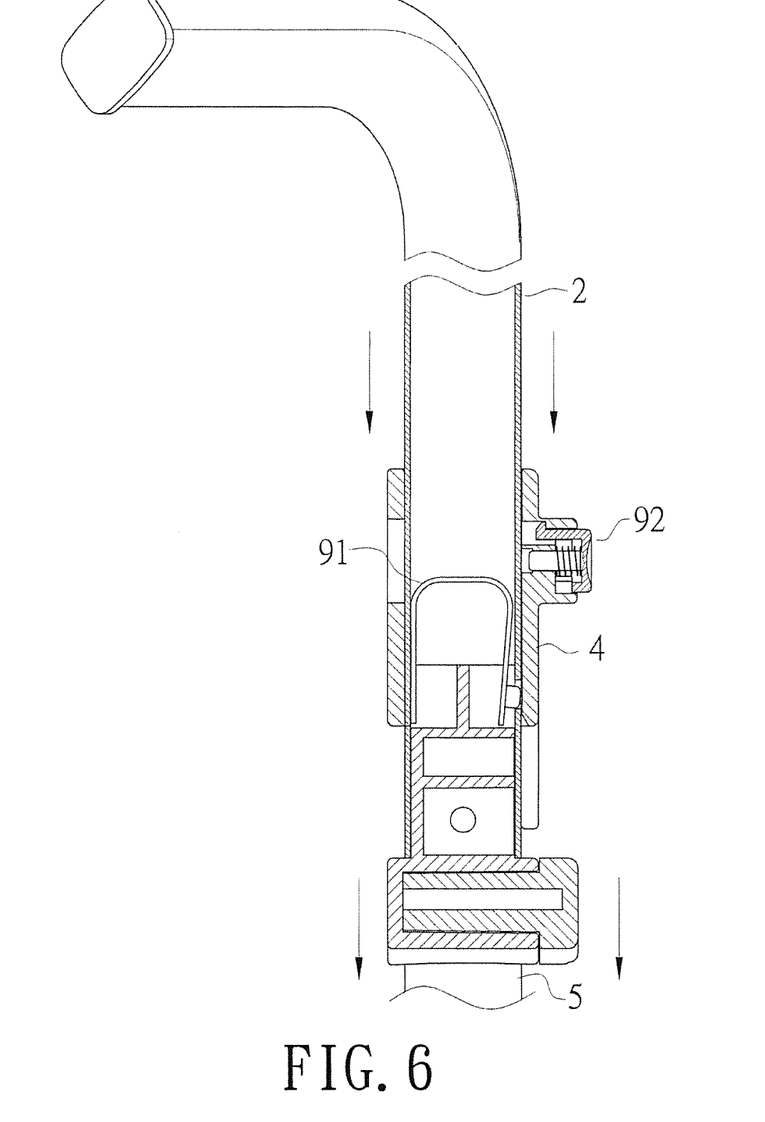
FIG. 6 is a cross sectional view to show that the handle is released and pushed downward.
Figure 7:
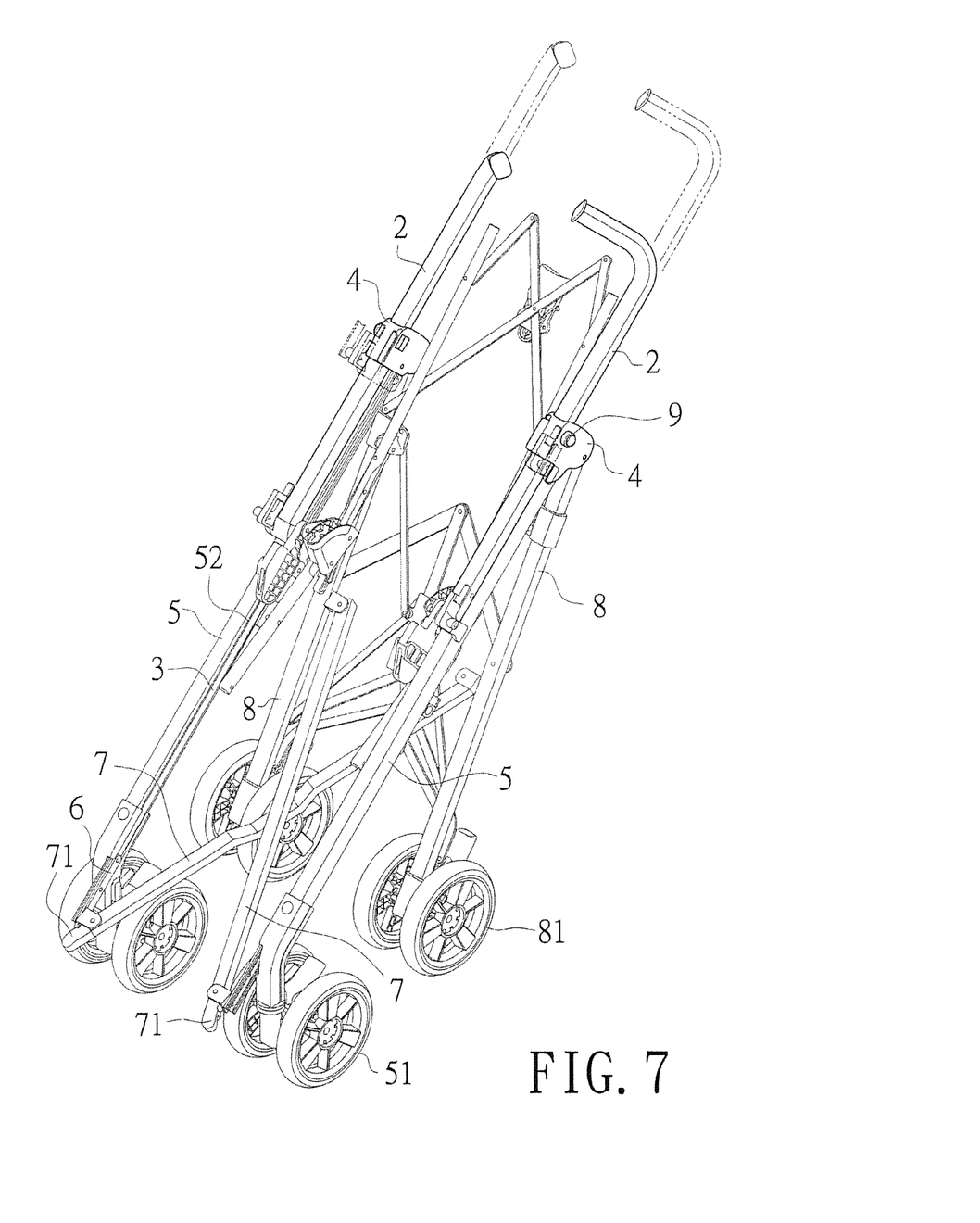
FIG. 7 shows that the baby stroller of the present invention is folded.
Figure 8:
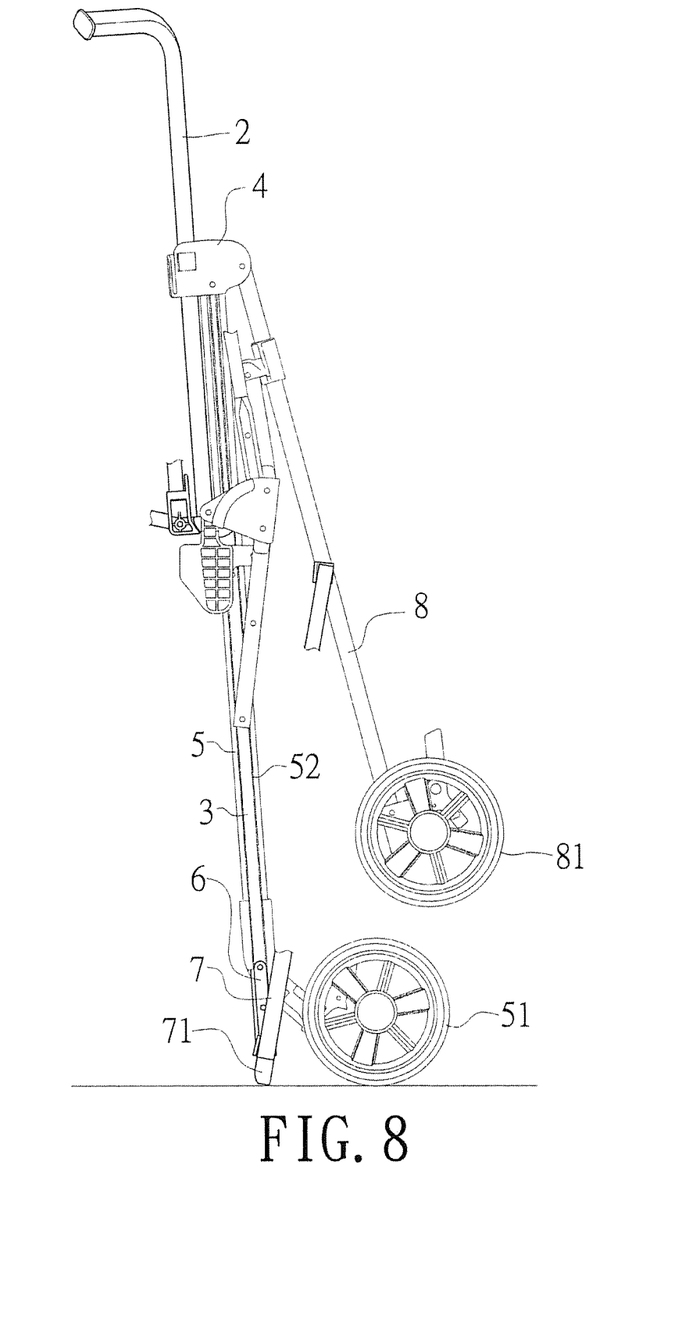
FIG. 8 shows that the baby stroller of the present invention is folded and stands on the floor.

As shown in FIGS. 6 and 7, the folded stroller is in the stand-up status, wherein two end pieces 71 are connected to respective front ends of the connection frame 7. The two end pieces 71 and two front wheels 51 of the baby stroller support the baby stroller when the baby stroller is folded.

The method for folding the baby stroller is to release handles 2 and push the handles 2 downward to fold the baby stroller and to let the baby stroller stand up.

While we have shown and described the embodiment in accordance with the present invention, it should be clear to those skilled in the art that further embodiments may be made without departing from the scope of the present invention.

What is claimed is:

1. A folding structure of a baby stroller, comprising:
two handles extending through two connection units respectively and being connected with two respective links, each of the two connection units connected with two respective top ends of a front frame and a rear frame, the two links movable along the front frames and being pivotably connected with two respective slides, a connection frame pivotably connected between the slides and the rear frames;
wherein each of the front frames has a slot in which the link is movably received;
a locking unit is located between the handle and the connection unit of each side of the baby stroller so as to lock the handle and the connection unit;
the locking unit comprises a resilient engaging member in the handle, and a resilient pressing member connected to the connection unit, the resilient pressing member is located corresponding to the resilient engaging member, the resilient engaging member has an engaging end extending beyond the connection unit, the engaging end is released from the connection unit by pressing the resilient pressing member so as to release locked status of the handle;
the resilient engaging member is a U-shaped member; and
the resilient pressing member comprises a space defined in the connection unit, a button and a spring, a shoulder is formed in an inside of the space, the button has a hook which is hooked to the shoulder, the button has a push rod extending from a center thereof and the push rod is located corresponding to the engaging end, the spring is mounted to the push rod.

2. The folding structure as claimed in claim 1, wherein two end pieces are connected to respective front ends of the connection frame, the two end pieces and two front wheels of the baby stroller support the baby stroller when the baby stroller is folded.

3. A folding structure of a baby stroller, comprising:
two handles extending through two connection units respectively and being connected with two respective links, each of the two connection units connected with two respective top ends of a front frame and a rear frame, the two links movable along the front frames and being pivotably connected with two respective slides, a connection frame pivotably connected between the slides and the rear frames;
wherein each of the front frames has a slot in which the link is movably received;
a locking unit is located between the handle and the connection unit of each side of the baby stroller so as to lock the handle and the connection unit;
the locking unit comprises a resilient engaging member in the handle, and a resilient pressing member connected to the connection unit, the resilient pressing member is located corresponding to the resilient engaging member, the resilient engaging member has an engaging end extending beyond the connection unit, the engaging end is released from the connection unit by pressing the resilient pressing member so as to release locked status of the handle; and
the resilient pressing member comprises a space defined in the connection unit, a button and a spring, a shoulder is formed in an inside of the space, the button has a hook which is hooked to the shoulder, the button has a push rod extending from a center thereof and the push rod is located corresponding to the engaging end, the spring is mounted to the push rod.

4. The folding structure as claimed in claim 3, wherein two end pieces are connected to respective front ends of the connection frame, the two end pieces and two front wheels of the baby stroller support the baby stroller when the baby stroller is folded.

* * * * *